United States Patent [19]
Mason

[11] 3,724,330
[45] Apr. 3, 1973

[54] SELF MONITORING CONTROL SYSTEM UTILIZING AN ELECTRICAL MODEL FOR EACH CONTROL MEANS

[75] Inventor: Richard K. Mason, Grandada Hills, Calif.

[73] Assignee: Textron Inc., Providence, R.I.

[22] Filed: July 12, 1971

[21] Appl. No.: 161,455

[52] U.S. Cl. ................................................91/363 A
[51] Int. Cl. ..............................F15b 9/03, F15b 9/09
[58] Field of Search............91/363 A, 363 R; 244/78

[56] References Cited

UNITED STATES PATENTS

| | | | |
|---|---|---|---|
| 3,426,650 | 2/1969 | Jenny | 91/363 A |
| 3,452,645 | 7/1969 | Barltrop | 91/363 A |
| 3,494,256 | 2/1970 | Bioletti et al. | 91/363 A |
| 3,505,929 | 4/1970 | Coppola et al. | 91/363 A |

FOREIGN PATENTS OR APPLICATIONS

| | | | |
|---|---|---|---|
| 1,332,700 | 6/1963 | France | 91/363 R |

Primary Examiner—Paul E. Maslousky
Attorney—Nilsson, Robbins, Wills & Berliner

[57] ABSTRACT

A control system having a plurality of control channels, each of which includes a servo control means having a valve which moves responsively to the application of control signals so as to control the flow of fluid from a source thereof to an output member connected for positioning a load. Electrical transducer means is connected to the control valve to produce an electrical signal which is characteristic of the servo control means. An electrical model which produces an output electrical signal which is characteristic of that signal desired for the servo control valve is provided. The output electrical signals are connected to a comparator for detecting disparity between the signals thus generated and then for providing an output signal which deactivates the particular servo control means wherein the failure has occurred which causes the disparity in the signals being compared.

7 Claims, 1 Drawing Figure

PATENTED APR 3 1973 3,724,330
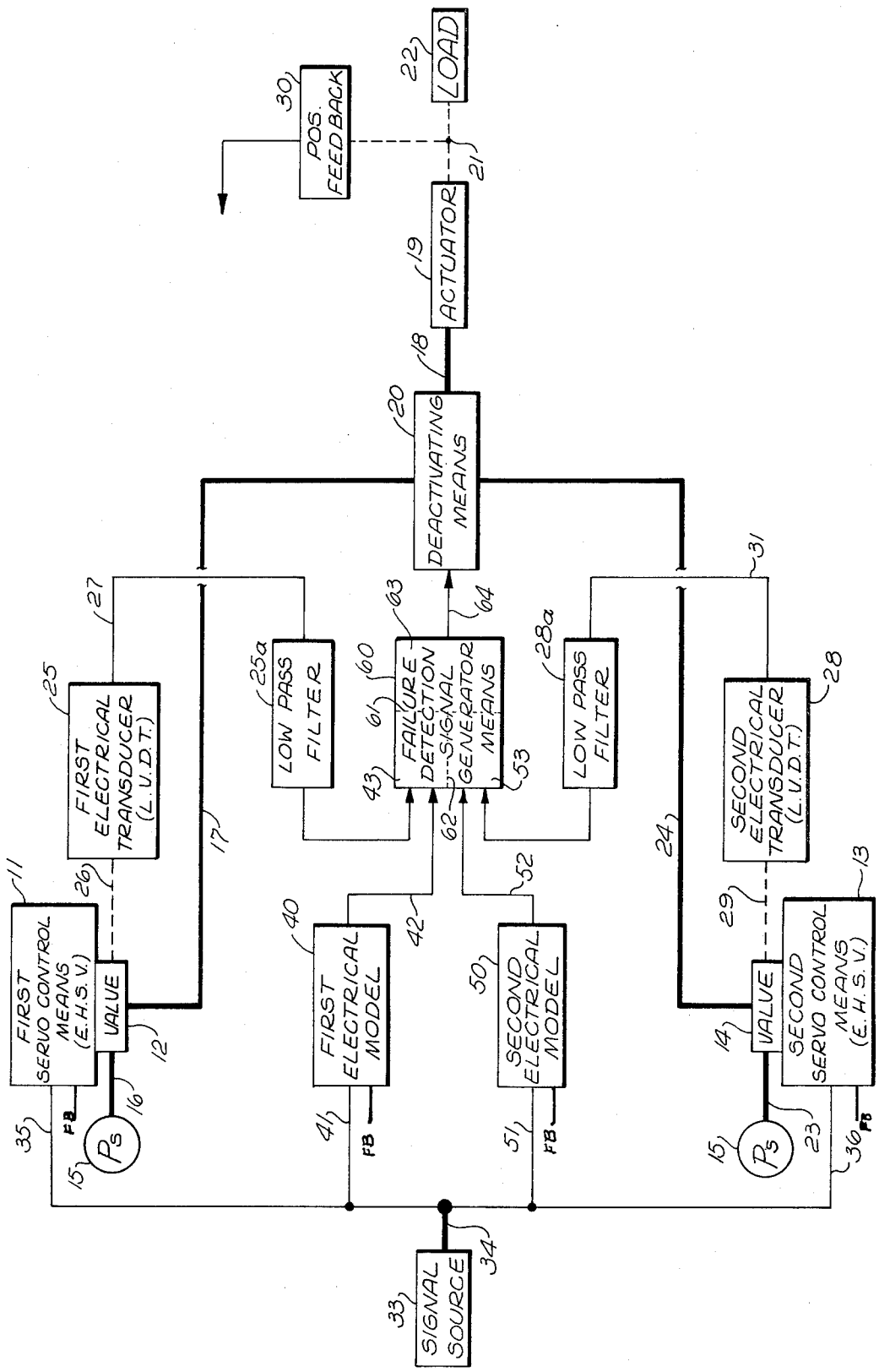

3,724,330

SELF MONITORING CONTROL SYSTEM UTILIZING AN ELECTRICAL MODEL FOR EACH CONTROL MEANS

FIELD OF THE INVENTION

The invention relates generally to control systems but, more particularly, to redundant control systems adapted for positioning a desired apparatus in response to application of input signals thereto.

BACKGROUND OF THE INVENTION

The best prior art known is as follows:

U. S. Pat. No. 3,437,312, issued Apr. 8, 1969 to Gavin D. Jenney entitled ELECTRICAL SIGNAL AND MONITORING APPARATUS FOR REDUNDANT CONTROL SYSTEM;

U. S. Pat. No. 3,338,138, issued Aug. 29, 1967 to Derek Wood, entitled REDUNDANT CONTROL SYSTEM;

U. S. Pat. No. 3,505,929, issued Apr. 14, 1970 to P. S. Coppola et al., entitled REDUNDANT FLIGHT CONTROL SERVO ACTUATOR.

While the various systems disclosed in the patents above-referred to operate exceedingly well for the particular applications concerned, it has been found that there are inherent problems in each of the systems. For example, severe loads applied by the apparatus being positioned to the actuator can affect the signals utilized in the comparison and logic means of the apparatus; the signals generated for comparator purposes are hydraulic signals and, therefore, require substantial weight in the fluid and plumbing associated therewith; cross-monitoring and comparison between channels is utilized, thereby introducing system pressure errors.

SUMMARY OF THE INVENTION

There is provided a control system having a servo control means including a flow control valve having an electrical transducer connected thereto for developing an electrical signal proportional to the position of the control valve. An electrical model of the servo control means is provided which produces an output electrical signal which represents the desired characteristic of the servo control means. The electrical signals are compared and in the event of a discrepancy, a failure signal is generated.

There is also provided a redundant control system which includes a plurality of control channels each of which includes a servo control means including a flow control valve having an electrical transducer connected thereto for developing an electrical signal proportional to the position of the control valve. An electrical model is provided which produces an output electrical signal which has the desired characteristic of the servo control means. Command signals, which are identical, are connected to each of the servo control means and the electrical models. Fluid from a source thereof flows through the control valve and a deactivating means to a load positioning means. Failure detection means receives the electrical signals produced and compares each electrical signal generated by the electrical transducer connected to the valve with the output signal of the electrical model for that valve and upon a predetermined threshold being exceeded by a disparity between the compared signals, there is produced a failure-indicating signal which is applied to the deactivating means to deactivate the control influence of the failed servo control means.

BRIEF DESCRIPTION OF THE DRAWINGS

The single FIGURE is a block diagram representing an overall schematic of a redundant control system constructed in accordance with the present invention.

DESCRIPTION OF THE PREFERRED EMBODIMENT

As illustrated in the drawing, the control system, in accordance with the present invention, includes a first servo control means 11 having a valve 12 which is positioned thereby. In addition, there is also provided a second servo control means 13 which includes a valve 14 positioned thereby. A source of fluid under pressure, 15, is connected by a conduit 16 to the valve 12. Flow of the fluid from the valve 12 is through the conduit 17 and a deactivating means 20 (to be described more in detail hereinbelow) and an additional conduit 18 to a load positioning device such as an actuator 19. The actuator 19 is connected, as indicated by the dashed line 21, to a load 22 thereby to position the same in accordance with desired input signals.

The source of fluid under pressure 15 is also connected by the conduit 23 to the valve 14. Positioning of the valve 14 causes the fluid to flow through the conduit 24 and the deactivating means 20 to the actuator 19 as above described.

The first electrical transducer 25 is connected, as indicated by the dash line 26, to the valve 12. Positioning of the valve 12 causes the first electrical transducer 25 to produce an output signal which appears on the lead 27. The output signal from the first electrical transducer is proportional to the position taken by the valve 12. Similarly, a second electrical transducer 28 is connected as shown by the dash line 29, to the valve 14. The second electrical transducer produces an electrical output signal which appears on the lead 31 and which is proportional to the position of the valve 14. The first and second servo control means may be any particular type of control apparatus known to the art. In the presently preferred embodiment, of the present invention, an electro-hydraulic servovalve is utilized. Such electro-hydraulic servovalves are well known in the art as exemplified by U. S. Pat. No. 2,947,286 and, therefore, detailed description or illustration thereof will not be given herein. In addition, the electrical transducers 25 and 28 may also be any device known to the art which function to develop an output signal of the desired characteristic. For example, linear potentiometers or linear variable differential transformers (LVDT) may be utilized. In the presently preferred embodiment, LVDT's are utilized.

A signal source 33 is connected by way of lead 34 and leads 35 and 36 as a signal to the first and second servo control means 11 and 13 respectively. The signal source 33 develops an output electrical signal which appears on lead 34 for application to the servo control means. The signal source 33 may include command signals generated by the operator of the load 22 and, as well, may also include position feedback signals which may be generated from feedback apparatus 30 connected to the actuator 19 or the load 22, as is well known in the prior art. In addition thereto, in some control systems, for example, those utilized in high performance aircraft, stability augmentation system outputs or autopilot control system outputs may also be utilized. In any event, the same electrical signal appearing on lead 34 is applied to both the first and second servo control means.

As is well-known in the prior art, the servo control means functions in such a manner that the valves, such as those shown at 12 and 14, position themselves responsive to the signal which is applied to the servo control means such as, for example, a torque motor, when an electro-hydraulic servo valve (E.H.S.V.) is utilized. Positioning of the valve, such as a spool valve, in devices of the type above-referred to, causes a controlled flow of the hydraulic fluid so as to move the actuator and, thereby, position the load 22 in accordance with the signals applied in the first instance to the electro-hydraulic servovalve.

The output signals from the first and second electrical transducers 25 and 28, as above pointed out, are generated by spool position of the spool valve of the electro-hydraulic servovalve of the first and second servo control means 11 and 13 respectively. Since the spool position controls the flow of fluid under pressure to the actuator 19, the spool position may be viewed as being proportional to the flow of fluid to the actuator. If one can generate an additional electrical signal which represents the desired output of a servo control means of the type being used in a particular control system, then such an output signal can be utilized for comparison with the signal actually being produced by the servo control means to ascertain whether the same is operating properly. That is, by comparing the output signal actually generated in response to a predetermined input signal with a second signal, known to be that which is desired in response to that input signal, one can electrically self-monitor the particular servo control means being utilized.

Therefore, and in accordance with the present invention, there is provided a first electrical model 40 which has applied thereto, by way of the lead 41, the signal developed and appearing on the lead 34 from the signal source 33. There is also provided a second electrical model 50 which is connected by way of a lead 51 to receive the same signal appearing at the lead 34 from the signal source 33. The first electrical model 40 is designed to have a transfer characteristic which is identical to the first servo control means 11, while the second electrical model 50 is designed to have a transfer characteristic which is identical to the second servo control means 13, including in each case the electrical transducers 25 and 28 respectively. Therefore, the first electrical model 40 produces an output signal appearing on the lead 42, responsive to the application of the signal from the signal source, which is identical to that signal which should be supplied by the first electrical transducer 25 and appearing on the lead 27. Similarly the output signal generated by the second electrical model 50 and appearing on the lead 52, in response to the application of a particular input signal appearing at the lead 51, is that electrical signal which should appear in response to the application of the same input signal at the lead 31, which is the output of the second electrical transducer 28. The electrical models utilized in any particular application may be any which are known to the art and may be readily designed by those skilled in the art, depending upon the particular application and the particular transfer characteristic of the control means being utilized. Therefore, a detailed description of the models will not be provided herein.

In design of the models, however, various other factors may be considered, one, for example, is the frequency response of the system. Typically, an electro-hydraulic servovalve may have a frequency response on the order of 100 cycles per second. However, the frequency response of the overall system, including the actuator, may be much less. Through proper selection of components and use of feedback, one may design a self-monitoring system wherein essentially only static conditions are being monitored. Such operational parameters would greatly simplify the electrical models used in the system. To accomplish such, a low pass filter 25a may be inserted in the signal lead 27 between the first transducer and the comparator 43 while a similar low pass filter 28a is inserted in the lead 31 between the second transducer and the comparator 53 (the comparators are discussed more fully below). Such filters would be designed to provide essentially a flat response up to about 40 cycles per second with essentially no passage of signals above that frequency. The low pass filter output signal is compared with the model output signal. Thus, all dynamics generated in the system by signals above 40 cycles per second are eliminated. In addition, by applying the position feedback signal from apparatus 30 directly to each of the models and servo control means, as shown by the dashed leads marked F.B., dynamic response characteristics are even further reduced.

There is also provided, in accordance with the present invention, a failure detection signal generator means 60 which generally performs the function of comparing the electrical signals applied thereto and, in the event of a discrepancy between the compared signals beyond a predetermined threshold amount, develops an output signal indicative of such discrepancy. Thus, the failure detection signal generator means 60 is illustrated by the dashed lines 61 and 62 as being divided into three different sections. Generally, the first section 43 may be viewed as a comparator to which is connected the leads 27 and 42, thereby applying the electrical signals generated by the first electrical transducer 25 and the first electrical model 40 for comparison by the comparator 43 to detect any discrepancies therebetween. Similarly, there is provided a comparator 53 to which is connected the leads 31 and 52 for applying the output signals from the second electrical transducer and the second electrical model for comparison thereby to detect any discrepancies therebetween. The third portion of the failure detection signal generator means may be viewed as the logic 63 which receives the output signals from the comparators 43 and 53 and ascertains which of the particular control means has malfunctioned. As a result of detection of the particular malfunction, a failure signal is applied to lead 64 which, as illustrated, is connected to the deactivating means 20.

Responsive to the application of the signal by way of the lead 64, the deactivating means 20 selectively deactivates the capability of the particular servo-control means which has caused the malfunction so that it no longer has the capability of applying fluid under pressure through the conduit 18 to the actuator 19. It can, therefore, be seen that upon such selective deactivation the failed control means is effectively eliminated from the system automatically. The activating means 20 again may be any deactivating means known to the art, several of which are illustrated and described in the above-identified patents any may include solenoid-operated valves, pressure-operated valves or spring-operated valves by way of example only. The particular deactivation means desirable for any particular application will be easily determinable by one skilled in the art. Therefore, further description or illustration of such deactivation means will not be provided herein.

Similarly, desired comparators and logic for receiving and operating upon the electrical signals of the type generated in accordance with the present invention are also well known to the prior art; and, for example, representative types thereof are illustrated in some of the patents above referenced. Therefore, additional description or illustration thereof will not be provided herein.

From the foregoing description it will be recognized by those skilled in the art that by providing a particular electrical model for a given control means one is comparing the operation of the control means on an input-output basis. That is, a comparison is being made of the input signal which is applied to the particular control means to the output of the control valve which is controlling the application of the fluid to the actuator. Effectively then, as above pointed out, the comparison is actually a comparison of the input voltage to the control means to the actual flow to the positioning means such as the actuator 19. Since a specific and individual electrical model is utilized for each of the control means being utilized, each control channel is self-monitored. That is, there is no cross channel monitoring of any type. As a result thereof, any deviations or fluctuations in system pressure, electrical component drift as a result of temperature or aging or the like from one channel to the next will have no effect upon the operation of the system.

As is well known in the prior art, there may also be provided a redundancy insofar as the signal source 33 is concerned. That is, a duplicate signal source may be utilized and connected to each of the control means and models if such be desired. Furthermore, any number of servo-control means and corresponding electrical models therefor may be utilized in accordance with the desired redundancy for a particular system. It will also be recognized that a single channel control may be utilized if such is desired, such, for example, as the first servo control means and the first electrical model. Upon comparison and detection of a disparity between the output electrical signals thereof, a signal could be generated indicating to the operator that a failure has occurred. Obviously, the logic in such a situation would be eliminated as not being required.

What is claimed is:

1. A self-monitoring control system for positioning a load responsive to application of command signals thereto comprising:

A. Control means including a fluid flow control valve;
B. Electrical transducer means connected to said flow control valve for developing an electrical signal proportional to the position of said control valve;
C. Electrical model means having the same transfer characteristics as said control means for producing an electrical signal representative of the ideal positioning of said flow control valve responsive to said command signal;
D. Means connecting said command signals to each of said control means and said electrical model means;
E. Load positioning means connected to receive fluid from said flow control valve;
F. Deactivating means connected to disable said flow control valve;
G. Failure detection signal generator means; and
H. Means connecting the electrical signals from said electrical transducer means and said electrical model means to said failure detection signal generator means and for connecting said failure detection signal generator means to said deactivating means for comparing the electrical signals of said transducer means and said model means and for generating a deactivating signal upon discrepancy between said compared signals.

2. A self-monitoring control system as defined in claim 1 wherein said control means is an electro-hydraulic servovalve.

3. A self-monitoring control system as defined in claim 2 wherein said electrical transducer means is a linear variable differential transformer.

4. A self-monitoring control system as defined in claim 1 wherein
said control means is a plurality of control means each having a control valve,
said transducer means is a plurality of electrical transducers each connected to a separate control valve, and
said electrical model means is a plurality of electrical models each having the same transfer characteristic as one of said control means.

5. A redundant control system for positioning a load responsive to application of command signals thereto comprising:

A. First and second servo control means each including a fluid flow control valve;
B. First and second electrical transducer means connected to said flow control valve of said first and second servo control means respectively for developing an electrical signal proportional to the position of each said control valve;
C. First and second electrical models having the same transfer characteristics as said first and second servo control means respectively for producing unique electrical signals representative of the ideal positioning of said flow control valves of said first and second servo control means, respectively, responsive to said command signals;
E. Load positioning means connected to receive fluid from said flow control valves;
F. Deactivating means connected between said flow control valves and said load positioning means;
G. Failure detection signal generator means; and H. Means connecting the electrical signals from said first and second electrical transducer means and said first and second electrical models to said failure detection signal generator means and for connecting said failure detection signal generator means to said deactivating means for comparing the electrical signals of said first transducer means and first model to each other and said second transducer means and second model to each other and for generating a deactivating signal upon discrepancy between said compared signals.

6. A self-monitoring control system as defined in claim 4 which further includes low pass filter means connected between each of said electrical transducer means and said failure detection means.

7. A self-monitoring control system as defined in claim 6 which further includes feedback signal generating means connected to said load positioning means and means for connecting signals generated by said feedback means to said servo control and model means.

* * * * *